United States Patent
Makram-Ebeid et al.

(10) Patent No.: US 7,286,693 B2
(45) Date of Patent: Oct. 23, 2007

(54) MEDICAL VIEWING SYSTEM AND IMAGE PROCESSING METHOD FOR VISUALIZATION OF FOLDED ANATOMICAL PORTIONS OF OBJECT SURFACES

(75) Inventors: Shérif Makram-Ebeid, Dampierre (FR); Maxim Fradkin, Paris (FR); Jean-Michel Rouet, Paris (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 616 days.

(21) Appl. No.: 10/511,176

(22) PCT Filed: Apr. 4, 2003

(86) PCT No.: PCT/IB03/01383

§ 371 (c)(1),
(2), (4) Date: Oct. 14, 2004

(87) PCT Pub. No.: WO03/088151

PCT Pub. Date: Oct. 23, 2003

(65) Prior Publication Data

US 2005/0163356 A1    Jul. 28, 2005

(30) Foreign Application Priority Data

Apr. 16, 2002    (EP)    .................... 02290949

(51) Int. Cl.
*G06K 9/00*    (2006.01)
(52) U.S. Cl. ....................... 382/128; 600/407
(58) Field of Classification Search ................ 382/128, 382/129, 130, 131, 132, 133, 134; 600/407, 600/410, 411, 425; 128/920, 922; 378/4, 378/21, 23
See application file for complete search history.

(56) References Cited

U.S. PATENT DOCUMENTS 5,891,030 A * 4/1999 Johnson et al. ............. 600/407
7,022,131 B1 * 4/2006 Derowe et al. ............ 623/1.11

FOREIGN PATENT DOCUMENTS

WO    WO 00/41134    7/2000

OTHER PUBLICATIONS

Loncaric, S., et al.; 3-D Deformable Model for Aortic Aneurysm Segmentation from CT Images; Proc. of 22nd EMBS Intl Conf.; 2000, pp. 398-401.
Zuiderveld, K.J., et al.; Multimodality Visualization of Medical Volume Data; Computers and Graphics; 1996, pp. 775-791.

* cited by examiner

*Primary Examiner*—Samir Ahmed
*Assistant Examiner*—Abolfazl Tabatabai (57) ABSTRACT

A medical viewing system having means, for analysing and visualising medical image data corresponding to folded surfaces, comprises means of segmentation of the image data to identify the object surface, means for approximating the object surface by a reference surface, and means for detecting folded portions of the object surface including means for determining points of the reference surface at which a normal to a zone forming a patch on the reference surface intersects with the object surface. If there are more than one point of intersection, then that patch corresponds to a folded portion of the object surface. Fold-portion patches are assigned a code such that, on display or printing of an image (RP) corresponding to the reference surface, the fold-portions will be flagged (for example by coloured or patterned regions (HP). Other fold-attribute data can also be determined, coded and displayed: for example, the number and location of intersections between the first surface and the normal to the fold-portion patch, the distance to the first intersection, the distance between the second and third intersections, etc.

13 Claims, 4 Drawing Sheets

MEDICAL VIEWING SYSTEM AND IMAGE PROCESSING METHOD FOR VISUALIZATION OF FOLDED ANATOMICAL PORTIONS OF OBJECT SURFACES

FIELD OF THE INVENTION

The present invention relates to a medical viewing system and to an image processing method for analysing and visualising medical images of the surface of an object, which comprises folded surface portions. The object may be an organ or a tissue or other anatomical element. The invention further relates to a medical examination apparatus having such a medical viewing system and to a computer program product having instructions for carrying out the method steps. The invention finds its application in the field of medical imaging and, more especially, in the field of x-ray medical imaging.

BACKGROUND OF THE INVENTION

Medical imaging seeks to provide the clinician with views of anatomical features, which aid in the diagnosis or treatment of the patient. Medical images of the anatomical features often include a portion of a surface of interest, called hidden surface portion, which is masked, not by a separate anatomical feature, but by another portion of the same surface, due to the fact that the surface is folded.

A system for the visualisation of surface irregularities of tubular structures, such as the colon, is already described in U.S. Pat. No. 5,891,030 "A System for Two and Three Dimensional Imaging of Tubular Structures in the Human Body" by Johnson et al. This patent relates to the visualization of surface irregularities of tubular shaped anatomical structures and allows solving problems related to regions of such structures that may be partly hidden during a virtual endoscopy. The inside of the colon is displayed via virtal colonoscopy, as if it had been collected using an endoscope travelling inside the colon. However, the user has to manually define the path of the virtual endoscope so that the detection of folds or of suspicious structures can be achieved. The efficiency of the detection depends upon the skill of the user.

There is a need for a means for the visualisation of folded anatomical surfaces, which enables hidden portions to be readily identified without effort on the part of the clinician.

It is to be understood that in this document, references to "anatomical features" or to "anatomical surfaces" are intended to be read broadly so as to designate any feature or surface in the body, whether human or animal, whether a vessel, an organ, a tissue or anything else, and include artificial elements implanted into or attached to the body.

SUMMARY OF THE INVENTION

It is an object of the present invention to provide a medical viewing system having means, which enables folded anatomical surfaces to be visualised more efficiently than heretofore. This problem is solved by a medical viewing system according to claim 1.

According to the present invention this medical viewing system comprises means for acquiring and processing image data in an image of an object whose surface comprises at least a folded portion, said data processing means comprising: segmentation means for segmenting the image data whereby to identify a segmented object surface; processing means for approximating said object surface to determine a reference surface, which represents an approximated surface of the object surface devoid of folded portions while comprising at least one flat patch; analysing means for determining points, for each patch of the reference surface, where the normal to the patch intersects the object surface and for identifying as a patch corresponding to a folded portion a patch of the reference surface that has a normal intersecting the object surface at more than one point; said medical viewing system further comprising image visualisation means for visualising the images.

It is also an object of the present invention to provide a medical viewing system having means for yielding processed images in which hidden surface portions are flagged so that the existence thereof is immediately apparent to the user. Hidden surface portions can be flagged to the user in a manner that provides information regarding the configuration of those hidden surface portions. These features of the medical viewing system are recited in dependent claims.

Advantages of this medical viewing system are among others that this system enables the user to have representation of a folded anatomical surface, in which hidden portions of the folded surfaces are automatically identified and preferably flagged. Thus, no effort is required by the user in order to determine that such hidden portions are present, and there is a reduced risk of such portions going unnoticed. By this means, the efficiency of the medical practitioner in the detection of folded surfaces, and in localizing potential abnormalities, is increased.

According to a preferred embodiment of the invention, the hidden portions are not directly displayed. To do so would result in a distorted representation of the anatomical feature of interest. Instead a representation of the segmented object surface is produced using conventional surface rendering techniques for display using conventional graphical visualisation techniques, for printing or for visualisation in other manners. Information regarding the configuration of the fold, that is information on fold attributes, is coded and superimposed on the rendered surface data, for example using colour coding, patterning, etc. Alternately, the coded information can be superposed on a flattened two-dimensional representation of the segmented object surface. The fold attributes that can be represented in this coded fashion include, but are not limited to, the number of times the surface folds back to be cut by the normal to a flat patch, also called facet, of the reference surface, the distance from the reference surface to the first intersection, the number of intersections within a given distance from the reference surface, etc. A selection of fold attributes to be represented can be predetermined or can be left to the choice of the user.

The medical viewing system can be implemented as a specially programmed general-purpose computer. The medical viewing system can be a workstation. The present invention further provides an image processing method, which has steps to actuate the processing means of the medical viewing system. The present invention yet further provides a computer program product having a set of instructions, when in use on a general-purpose computer, to cause the computer to perform the steps of the above-described method. The present invention still further provides a medical examination apparatus incorporating medical imaging apparatus, data processing system putting into practice the above-described method to process medical image data obtained by the imaging apparatus, and means for visualising the image data produced by the method. The visualisation apparatus typically consists of a monitor connected to the data processing apparatus.

Advantageously, the workstation and medical imaging system of the present invention are interactive, allowing the user to influence fold attribute data that is evaluated and/or the manner in which evaluated data is to be visualised

BRIEF DESCRIPTION OF THE DRAWINGS

The invention is described in detail in reference to the following schematic figures.

DESCRIPTION OF EMBODIMENTS

The invention relates to a medical viewing system for the analysis and visualization of folded anatomical objects in Medical Imaging. Examples of such objects are the convolutions of the brain white or grey matter as observed in 3-D Magnetic Resonance Images (RMI) or the inside surface of the colon as observed in 3-D Computed Tomography Images within a colon examination procedure. The basic object of the invention is to improve the efficiency of the medical practitioner for the examination of folded surfaces in 3D data sets and in localizing potential abnormalities. For brain images, the medical viewing system according to the invention can graphically represent the topology of the brain gyri (outward going folds) and sulci (inward going folds) as colour or grey tone regions displayed on a smooth "average" surface of the brain. For colon images, the viewing system of the invention can graphically represent the folded regions of the colon, which would normally be hidden in a flythrough virtual colonoscopy rendering of the inside of the colon. Hence, the viewing system allows the detection of a suspicious structure that the practitioner may interpret as a polyp, which could be an early phase of a cancerous tumour. Such structure is usually observed as a local irregularity of the inside colon surface extending within the colon.

The present invention will be described in detail below with reference to embodiments applied to visualisation of folded portions of the surface of the colon. In these examples, three-dimensional (3-D) image data representing the colon is obtained as 3-D Computed Tomography (CT) Images. The image data may however be provided by other types of imaging technology. The present invention relates more generally to a medical viewing system associated to a medical examination apparatus using any types of imaging technology and there is substantially no limit on the human or animal feature of interest that can be the object of the images.

The below-described steps of a preferred method of processing and visualising medical image data corresponding to folded surfaces can conveniently be performed by the medical viewing system comprising data processing means, such as a general purpose computer. The medical viewing system may be integrated into the medical examination apparatus or associated therewith (typically being in close proximity thereto). Alternatively the data processing may be performed on a workstation that is physically remote from the medical examination apparatus. The image data can be input to the medical viewing system by any suitable means, for example, as a "live feed" via a cable, after intermediate storage of the image data on a recording medium, such as a CD-ROM, DVD or the like, by transmission over a network, such as LAN, WAN, Internet, etc.

Although medical imaging technology is well developed, current techniques are inadequate when applied to the visualisation of folded surfaces. The problem can be better understood from consideration of FIG. 1A that represents an anatomical surface in the highly schematic form of a cylinder 1 illustrating a tubular organ such as the colon. The tubular organ 1 has an ellipsoidal bulge B on a part of its curved surface. FIG. 1B illustrates a schematic cross sectional view of the surface SOS of the tubular organ 1 with the bulge B. FIG. 1B shows the orifice O of the bulge B, and the different portions D1, D2, D3 of the interior of said bulge B. The portions D1 and D3 are folded surfaces whose analysis and visualization are the objects of the invention. If conventional medical imaging techniques are used to display a view of the inside of the tubular organ, looking towards the bulge B, then the displayed view, in simplified form, will resemble the feature shown in FIG. 1C. In FIG. 1C, grey scales are used to give an impression of the depth representing the distance between the viewer and the displayed surface. It will be seen that the viewer only has presented to him the interior surface of the tubular organ, together with that portion of the interior surface of the ellipsoidal bulge B that is visible through the opening, O, leading to the bulge. However, there are portions of the interior surface of the ellipsoidal bulge that are hidden. Thus the clinician is unable to view these hidden surface portions corresponding to the portions D1 and D3, which may be of clinical interest. Moreover, the clinician may not even appreciate that there are hidden surface portions. Furthermore, using conventional techniques, the same view would be displayed irrespective of the shape of the bulge B, provided that the opening O had the same size.

Figure 2:
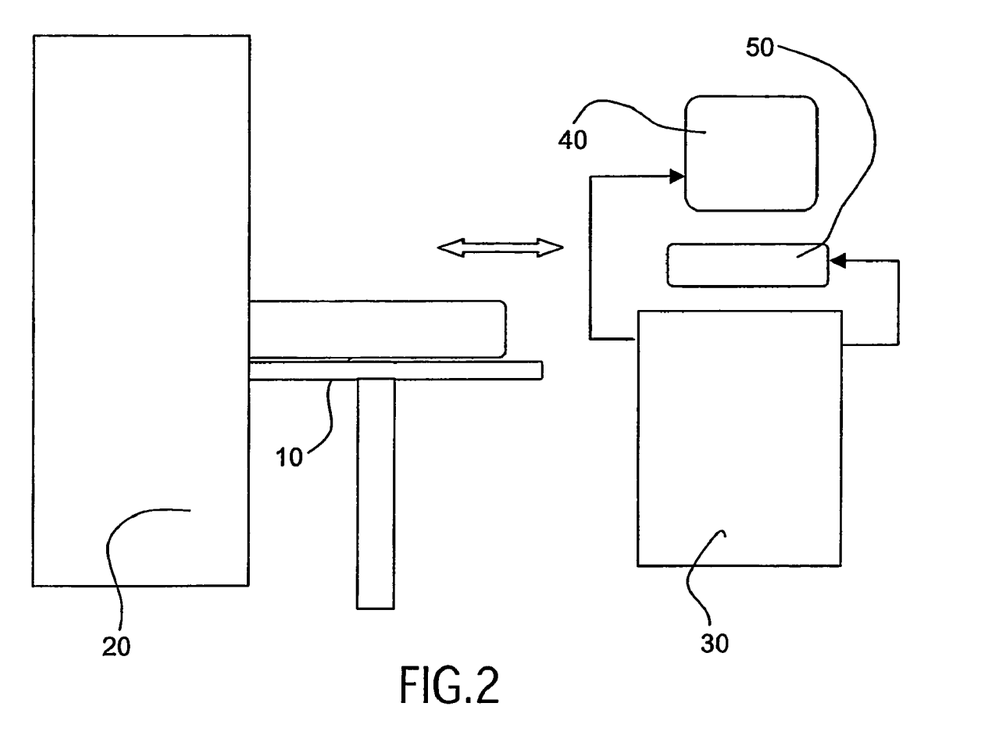
FIG. 2 is a block diagram illustrating elements of a medical examination apparatus, incorporating a medical viewing system.

FIG. 2 shows the basic components of an embodiment of an image viewing system in accordance with the present invention, incorporated in a medical examination apparatus. As indicated schematically in FIG. 2, the medical examination apparatus typically includes a bed 10 on which the patient lies or another element for localising the patient relative to the imaging apparatus. The medical imaging apparatus may be a CT scanner 20. The image data produced by the CT Scanner 20 is fed to data processing means 30, such as a general-purpose computer. The data processing means 30 is typically associated with a visualisation device, such as a monitor 40, and an input device 50, such as a keyboard, pointing device, etc. operative by the user so that he can interact with the system. The elements 10-50 constitute a medical examination apparatus according to the invention. The elements 30-50 constitute a medical viewing system according to the invention. The data processing device 30 is programmed to implement a method of analysing medical image data according to preferred embodiments of the invention.

Figure 3:
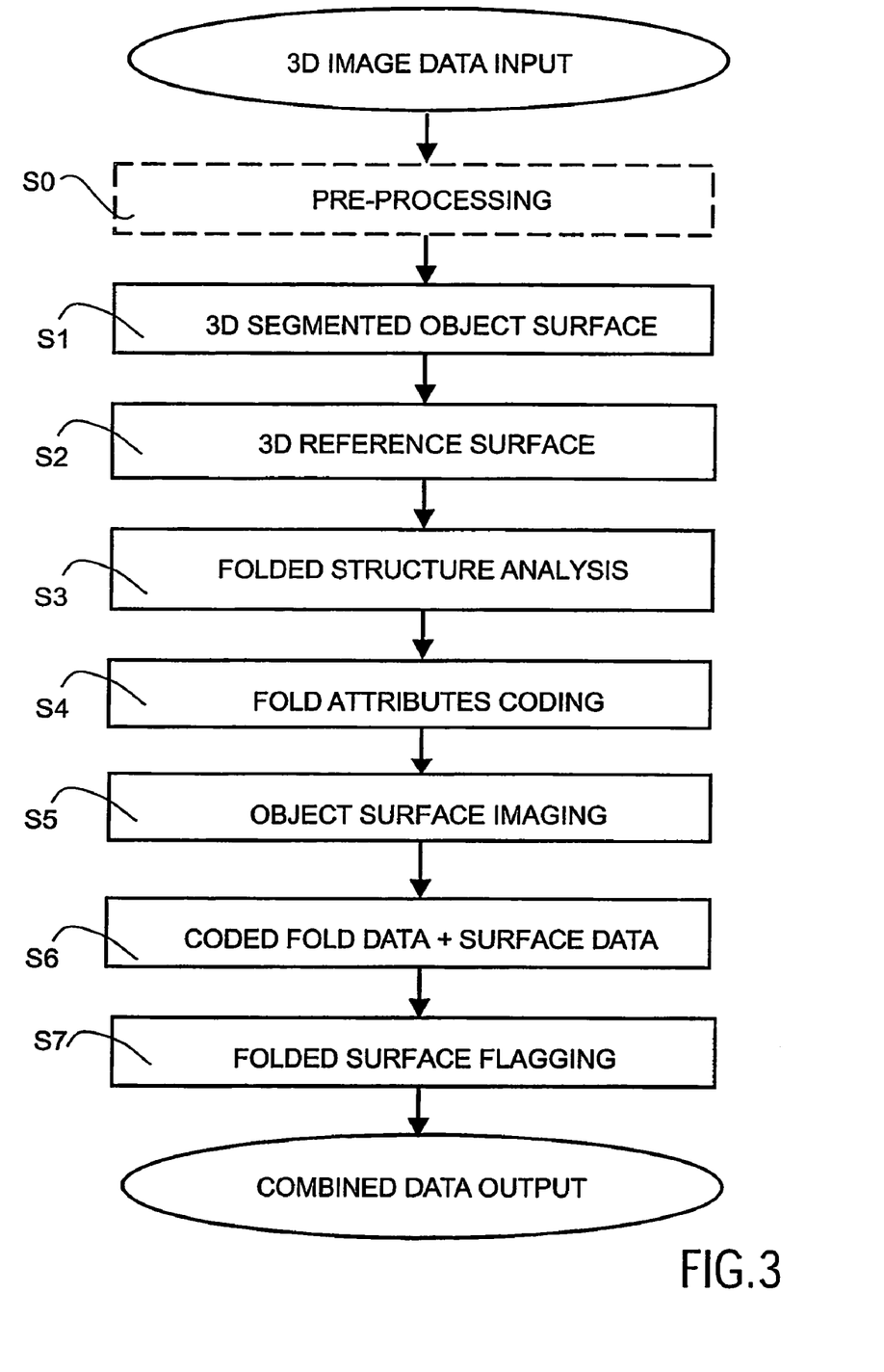
FIG. 3 is a flow diagram illustrating steps of a preferred image data analysis and visualisation method according to the present invention.

FIG. 3 is a flow diagram showing the steps in the preferred method of processing medical image data to enabling improved visualisation of folded surfaces represented in the data.

The image data input to the method is, in this example, 3-D computed tomography image data obtained for a subject colon.

In step S0, the input image data may be subjected to conventional pre-processing, for example, to eliminate low-resolution features.

In step S1, three-dimensional surface segmentation is performed to identify image data corresponding to a surface of interest of the colon. This surface comprises at least a folded portion, such as the bulge B of FIG. 1A. The operation of step S1 yields data of a 3-D segmented object surface, denoted by SOS, comprising said folded portion. In a conventional technique of segmentation, the 3-D data is traversed and compared with a threshold value to decide which image data will be considered to represent the surface of the colon. The colon walls are absorbent and so appear light, whereas the interior of the colon appears dark. Thus, a comparison of the measured image data, which corresponds to measured intensity values, with a threshold value, is appropriate to determine the location of the colon walls.

In a step S2 the segmented object surface SOS is processed to yield a 3-D simplified surface, which approximate the segmented object surface SOS and which is devoid of folded surfaces. According to the invention, each of the inward and/or outward folds is not directly displayed. Instead the segmented object surface is simplified using for instance morphological processing so as to remove the inward and/or outward folds and to obtain a smoothed version of the segmented object surface, called simplified surface.

Figure 4:
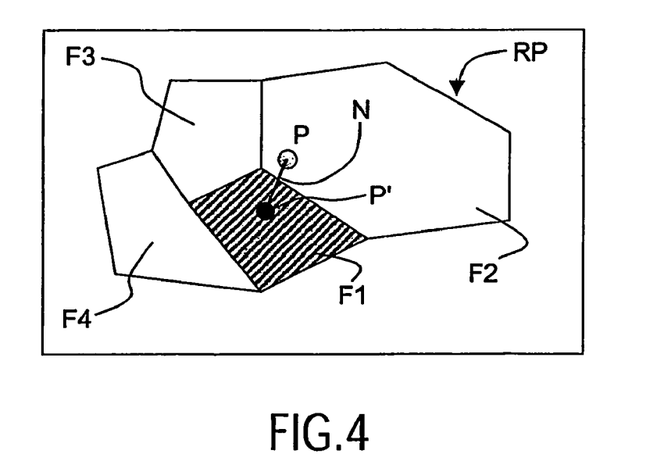
FIG. 4 illustrates a technique for mapping points of the segmented object surface onto the reference surface.

Then, this simplified surface is discretised. This operation permits to obtain a 3-D surface closely approximated by a polyhedron referred to as "reference surface" or "reference polyhedron". For example, the operation of simplifying the surface of the colon may produce a 3-D smoothed cylinder from which the operation of discretisation produces the 3-D reference polyhedron, denoted by RP, which approximates the segmented object surface of interest SOS. As illustrated by FIG. 4, the surface of the reference polyhedron may comprise adjacent flat patches of points, such as F1, F2, F3, F4. In a region of interest, the surface of the reference polyhedron RP comprises several patches of points or at least one patch of points.

Three dimensional surface segmentation techniques, and techniques to discretise the surface, are well known and so will not be described in detail here. Further information on segmentation can be found in the "Handbook of Medical Imaging, Processing and Analysis", editor-in-chief Isaac N. Bankman, Academic Press, chapter 5 "Overview and Fundamentals of Medical Image Segmentation" by Jadwiga Rogowska.

It can also be useful to produce a 2-D representation, to provide the user with a reference surface, which is a flat polygonal overview of the reference polyhedron RP. Typically, this will be a conformal map, which is an angle-preserving map of this reference polyhedron. This flat polygonal reference surface is referred to in the following as 2-D reference map, denoted by 2-D RM.

In step S3, the surface data is processed in order to analyse any folded structure that may be present. Concretely, as illustrated by FIG. 4, the reference polyhedron RP shows one or several flat patches, each patch being approximately in the form of a facet, which is typically a polygonal element, F1, F2, F3, F4 etc. For each patch or facet of the reference polyhedron RP approximating the segmented object surface SOS, an analysis is made of the image data along normals N to that patches or facets, so as to detect hidden or folded portions of the segmented object surface of interest SOS, and to evaluate various attributes of said folded portions.

As illustrated by FIG. 4, all points of the segmented object surface SOS are mapped onto the reference polyhedron RP. This mapping is performed in such a manner that any point P of the segmented object surface SOS is mapped only once onto the reference polyhedron RP. The preferred embodiment to achieve this purpose is to map a point P to the nearest point P' of the reference polyhedron RP which is located at the nearest patch or facet of the reference polyhedron RP. In FIG. 4, for example the point P is mapped on P' of facet F1. Point P' is on the hatched patch F1 of the reference polyhedron RP which is the nearest to P.

Figure 5A:
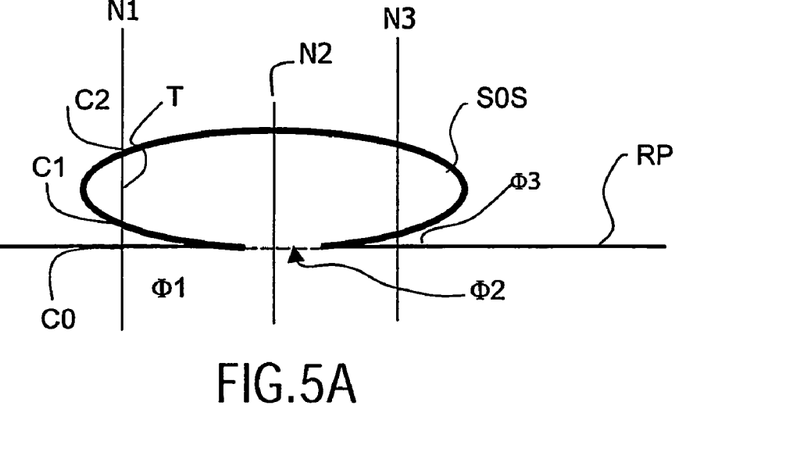
FIG. 5A illustrates the step of analyse of hidden portions applied to a folded surface such as the bulge of FIG. 1A.

As illustrated by FIG. 5A, which represents a cross section of the segmented object surface SOS together with the corresponding reference polyhedron RP comprising facets, denoted by $\Phi1$, $\Phi2$, $\Phi3$, the folded surfaces are detected by analysing the intersection of normals N1, N2, N3 to the respective facets $\Phi1$, $\Phi2$, $\Phi3$, with the segmented object surface SOS. In other words, for each patch or facet of the reference polyhedron RP, the closest associated point of the segmented object surface is detected.

A folded surface is detected when the normal to the facet crosses the segmented object surface more than one time. When the surface is folded, there will be more than one point, such as C1, C2 along the normal Ni to the patch or facet $\Phi1$ of the reference polyhedron RP, crossing the segmented object surface of interest SOS. Patches or polyhedral facets of this type, where there is no one-to-one relationship between the segmented object surface and the reference surface, are identified as corresponding to "hidden portions" of inward or outward folds. A list of patches or facets corresponding to "hidden portions" is generated. Typically this list will be stored in memory, together with associated fold attribute data. The list of hidden portions may also be output in any convenient form, for example, in electronic form, as a printed list, etc.

In step S4 one or several fold attributes related to said hidden portions are determined and coded as described below.

A first example of fold attribute relates to a measurement of the distance between each facet $\Phi1$, $\Phi2$, $\Phi3$ of the reference polyhedron RP and the closest associated points, in the segmented object image SOS data, which correspond to the surface of the colon. The measurement is performed on the respective normals N1, N2, N3 to the facets $\Phi1$, $\Phi2$, $\Phi3$. In the case of a structure having an inside and an outside, such as the colon, the distance receives a negative sign if the associated point is situated inside the three-dimensional reference polyhedron and a positive sign if the associated point is situated outside. This signed distance is defined along the normal N1, N2, N3 to the respective patch or facet $\Phi1$, $\Phi2$, $\Phi3$ of the reference polyhedron RP. The distance is zero when the detected point of the segmented object surface is actually on the patch or on the flat polyhedral face, such as the point CO of SOS with respect to the facet $\Phi1$. The measured signed distances are stored.

A second example of fold attribute relates to the number of times the normal to a facet of the 3D reference polyhedron RP crosses the segmented object surface SOS. Respective different codes, resulting in different visual indications, such as colours, patterns, etc., in a visual representation of the surface, can be assigned to fold portions corresponding to two crossings, three crossings, etc.

A third example of fold attribute relates to the distance between the facet of the 3D reference surface RP and the "first crossing" of the normal thereto. In other words, the "depth" of the first crossing may be of clinical importance. Thus, different codes can be assigned to indicate the respective different depths of the "first crossing", denoted by C1 with respect to C0, on FIG. 5A. These different codes, once again, result in different visual indications, such as colours, patterns, etc., in a visual representation of the surface.

A fourth example of fold attribute, which can be of clinical significance, is the distance between the first crossing, denoted by C1 on FIG. 5A, and the second crossing, denoted by C2, measured on the normal N1 to the corresponding facet Φ1, with the segmented object surface SOS. In a case, such as that illustrated in FIG. 5A, where the surface folds back on itself substantially through 180°, this distance can indicate the "thickness", T, measured on N1, of the fold. This thickness is the distance between the opposing surfaces at the inner side of the bend. Thus, different codes can be assigned to indicate the respective different distances between the first and second crossing points C1-C2, resulting again in different visual indications when the image data is displayed, printed, etc.

In order to avoid spurious effects, it can be advantageous to ensure that the region between the first and second crossing points, such as C1, C2, really does correspond to the void "inside" a fold, and not to a region inside the colon wall, for example. This can be achieved by measuring the distance between the first and second crossing points C1, C2 only when the image data in-between those crossing points takes a certain intensity or brightness value. For example, in the case of Computed Tomography images of the colon, if the image data along the normal N1 to the 3-D reference polyhedron RP, in-between the first and second points C1, C2 where the segmented object surface crosses that normal N1, takes values corresponding to "black", then that region is a void, it does not correspond to the colon wall.

In embodiments of the present invention, it is advantageous for the measurement of points of intersection of the normal, such as N1, N2, N3, to a patch or facet, such as Φ1, Φ2, Φ3 of the 3D reference polyhedron RP, with the segmented object surface SOS, to take into account crossing points C1, C2 etc. only up to a certain threshold distance away from the reference polyhedron RP. If crossing points further than this threshold are considered then they may, in fact, relate to completely different anatomical features, and not the surface of the anatomical feature of interest (bearing in mind that vessel walls, tissues etc are at least partially transparent to the radiation used in most medical imaging techniques). The appropriate value of the threshold distance varies with the anatomical feature in question.

In further examples, in a medical viewing system where the visualisation of the medical image uses a projection-based approach, the point of projection and the angle of projection can constitute a set of attribute data that can be calculated and stored with respect to image points corresponding to folded portions of the surface.

Other fold attributes than the above-described examples can be calculated and stored. Besides, the particular fold attributes to be evaluated can be pre-programmed into the data processing device implementing the method of the present invention.

In step S5, different representations of the surface of interest are produced for display, printing, etc. At least one of these possible representations is intended as a support for superimposing the coded information related to the attributes of the fold surfaces.

In a first example of representation, the reference polyhedron RP and/or the conformal reference 2-D map RM, are used for displaying the fold attributes. Once the segmented object surface of interest has been identified in the input image data by the segmentation step, three-dimensional surface rendering is performed. Typically, a projection-based approach is used in which a notional point of view and viewing angle are selected for visualisation of the surface of interest. Shading may be used to convey depth information (regarding the distance from the viewpoint to the different portions of the surface). Three-dimensional surface rendering techniques are well known and so will not be described in detail here. Further information can be found in the "Handbook of Medical Imaging, Processing and Analysis" mentioned above, chapter 41, especially page 663, relating to visualisation of iso-surfaces separating the inside of a region, where for example, image data has grey value=1, from its outside, where for example, image data has grey value=0. Different approaches are possible for the visualisation or display of the surface of interest and this affects the rendering process. For tubular structures, such as the colon, bronchii, vessels, etc., one popular approach is to display the data as if the viewer were flying through the structure in question. On this approach, image data corresponding to the surface at one end of the tubular structure is rendered first, then image data corresponding to the next portion along the tubular structure is rendered, and so on, until the other end of the tubular structure is reached. Thus, on this approach, the output from the surface rendering process is time-dependent.

In a second example of representation, the whole, or a segment, of the colon may be represented in a "one-shot" manner, typically by presenting one cross-sectional view, or simultaneous multi-perspective views, typically orthogonal cross-sectional views.

In a third example, the user may choose to use the segmented object surface SOS as a support for displaying the information related to the fold attributes.

In a fourth example of representation, the 3-D segmented object surface data may be processed in order to produce a flattened surface, for example opened and unrolled, in the case of the colon surface.

In step S6, the coded fold attribute information is superimposed on the representation of the object surface of interest chosen as a support for said information. For example, the signed distances may be displayed as grey level texture on the reference 3-D polyhedron RP and/or on the conformal reference 2-D map RM. Optionally, folds of the 3-D segmented object surface are segmented and based on a set of shape and geometric attributes. One instance of such attributes is the number of times the normal to the reference polyhedron cuts the segmented object surface.

The user can be given the possibility to choose the kind of representation of the surface of interest. Also the user can be given the possibility to choose which fold attributes should be estimated in step S3 and displayed in step S6. As an example, in the medical viewing system where the visualisation of the medical image uses a projection-based approach, the following set of attribute data could be stored with respect to image points corresponding to folded portions of the surface: the point of projection, the angle of projection, the number and depth of points where the segmented object surface SOS intersects with the normal N to the image point on the 3-D reference surface RP (up to a threshold distance), and the distance between first, second, third or more such crossing points C1, C2, etc. (as mentioned above, this can be characteristic of a particular shape of fold). The visual coding may take any suitable form.

Depending upon the type of examination in progress, the determined geometric attributes of the folds allow a determination to be made as to whether or not an abnormality alarm indication should be given. For example, there is a risk that the fold in question corresponds to a polyp shape in the inward part of the colon.

In step S7 once the analysis has established which facets of the reference polyhedron correspond to "hidden portions" of the surface of interest, and any desired fold attribute data related to hidden portions have been determined, coded and combined with the surface image data, the method according to the present invention provides for the existence of these "hidden portions" to be flagged to the user as potential abnormalities. The preferred technique for flagging these portions to the user consists of the use of a visual coding to highlight, on the representation of the object surface, the location of hidden portions, and/or to indicate fold attribute data.

The resultant image data is output for visualisation. In the resultant image, the visual coding and flagging may take any suitable form. Typically, it may consist of colour-coding, provision of hatching or other patterning. The choice may be left to the user as to which fold attributes to code and flag; and/or as to the method to be used for coding and flagging the fold attribute data. Alternatively, the fold attribute data may be coded and flagged according to predefined rules. Whatever the case, the selected fold attribute data is coded, step S4, and combined with the object surface data corresponding to the segmented object surface as in step S6, and possibly flagged as in step S7 of FIG. 3.

Figure 1A:
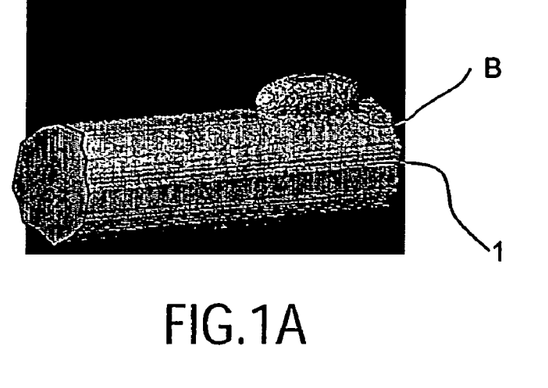
FIG. 1A illustrates the exterior of a tubular organ haying a bulge that is a folded surface.
Figure 1B:
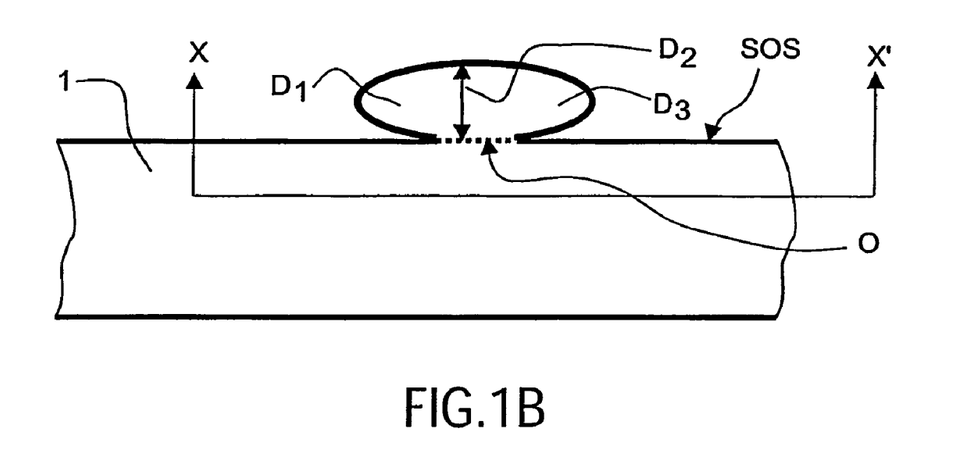
FIG. 1B illustrates a longitudinal cross section of the segmented object surface of the tubular organ and FIG. 1C is a show of the interior of the organ of FIG. 1A in the direction of the bulge.
Figure 1C:
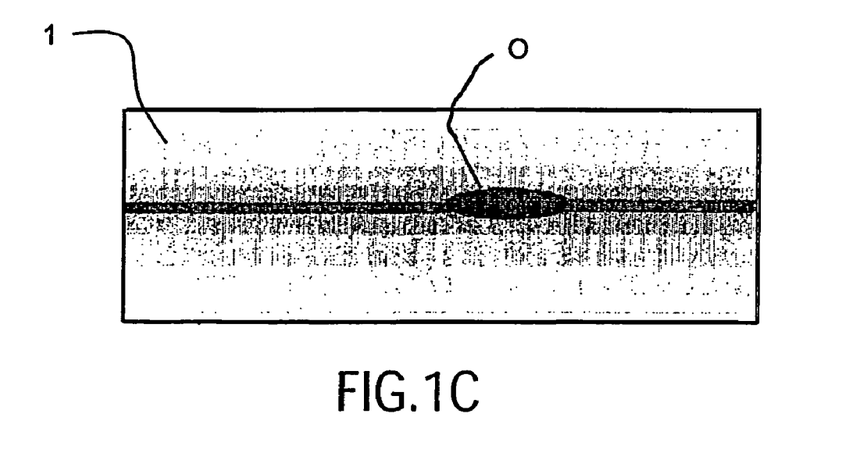
Figure 5B:
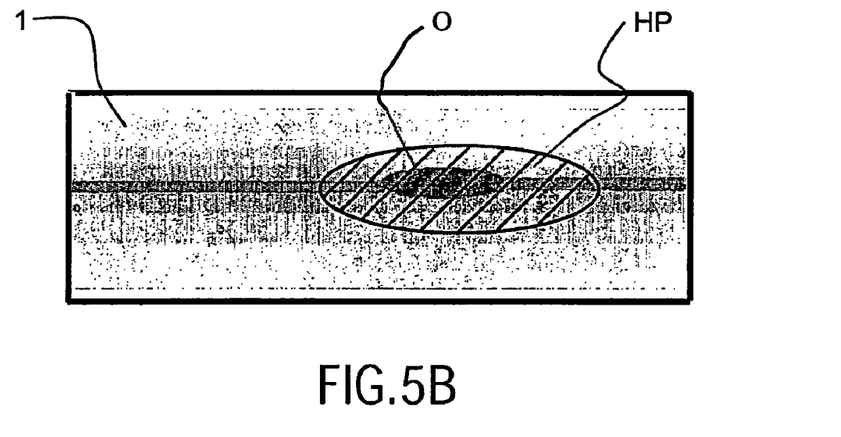
FIG. 5B and FIG. 5C show a first and a second types of displayed view, looking in the direction indicated by X-X' in FIG. 1B.

FIG. 5B illustrates one type of view that could be displayed of the output data resulting from application of the above-described method to image data representing the surface of the object of FIG. 1A, looking in the direction indicated by line X-X' of FIG. 1B. In FIG. 5B, the object surface representation is an unrolled portion of the object surface. The hidden portions of the surface are indicated by patterning, here indicated by hatching HP. Grey scale texture indicates "depth", that is, gives an impression of the distance between the viewer and the object surface.

Figure 5C:
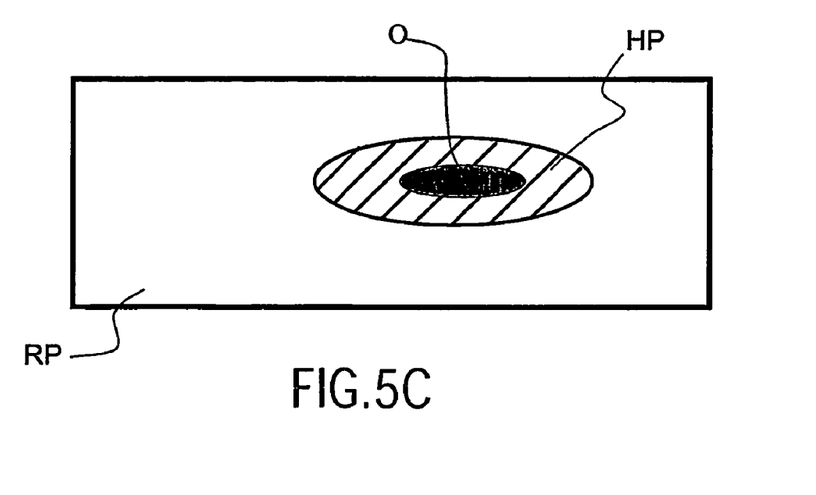

FIG. 5C is an alternative view based on the same basic data as FIG. 5B. Points lying on the 3D reference polyhedron RP, i.e. the cylinder, are assigned a white colour code, points at the apex of the bulge B are at a depth D2 from the reference polyhedron and are assigned a grey colour code. Once again, patterning, illustrated by hatching HP, indicates hidden portions of the surface that are not directly visible.

As can be seen from FIG. 5B and FIG. 5C, when the image data resulting from the method of FIG. 3 is visualised, the user immediately sees which portions of the surface of interest have "hidden", or "folded", portions, because these portions are flagged by patterning in the image. These flagged portions may correspond to potential abnormalities. The user can then investigate these regions further, for example, by visualising the regions around these portions using conventional techniques, e.g. using orthogonal cross-sectional views.

Alternatively, in certain embodiments of the present invention, the efficiency of the medical practitioner can be further enhanced by offering a tour along the inside of the folded surface portion that has been identified. The guided tour of the fold may be manually defined by the user or it may be predefined using known techniques for automatic following of the centreline of a structure, in other words, following the morphological skeleton of the fold. An optimal path algorithm, such as a grassfire algorithm, can be used to define the path. A suitable technique for construction of a 3-D, for navigation and guidance of a virtual endoscope providing this tour in an unbranched fold, is described in EP-A-1 058 913.

The above description, given with reference to FIG. 3, of a preferred method of analysing and visualising medical image data to improve visualisation of folded surfaces refers to production of image data for output, typically for display, to yield a 3-D and/or 2-D representation of the surface of interest, with coded fold attribute data, and/or abnormality classification data, presented thereon via use of colour-coded and/or patterned regions.

Yet another optional extension of the basic techniques of the present invention consists in providing a library or database of shape and geometric attributes characterising folded structures that are pathological. In consultation with medical experts, sets of attributes can be established and stored together with information regarding the corresponding pathology class. The analysis procedure of the present invention then includes a step of analysing the attributes of the detected folded portions of the surface of interest by application of pattern matching techniques to determine whether or not the attributes of the folded portions match any of the sets of attributes stored in the database. Pattern recognition techniques are well known and so will not be described in detail here. If a match is found, then data is output to the user, or an alarm indication is given, to indicate the finding of a potential abnormality. Preferably the classification of the potential abnormality is also indicated. When the surface of interest is displayed, further colour coding or patterning can be used to indicate potential abnormalities of different types. In some cases the user may wish to limit the types of abnormalities that will be sought to only a subset of those in the database. The medical viewing system of the invention can be programmed to give the user the option of setting the abnormalities to be considered.

The drawings and their description hereinbefore illustrate rather than limit the invention. It will be evident that there are numerous alternatives that fall within the scope of the appended claims. In this respect the following closing remarks are made.

Different imaging techniques can be used to obtain medical image data, preferably 3-D image data, of the anatomical feature of interest. For example, 3-D Magnetic Resonance Images are often used when studying the brain, 3-D Computed Tomography Images are often generated during a colon examination procedure, etc. The present invention is applicable without limitation by reference to the imaging technology used to obtain the image data. Moreover, the imaged feature can be substantially any anatomical feature of interest, specifically the present invention is not limited to visualisation of portions of the brain or colon.

Moreover, although the present invention has been described in terms of generating image data for display, the present invention is intended to cover substantially any form of visualisation of the image data including, but not limited to, display on a display device, and printing. Any reference sign in a claim should not be construed as limiting the claim.

The invention claimed is:

1. A medical viewing system comprising data acquisition means and data processing means for acquiring and processing image data in an image of an object whose surface comprises at least a folded portion, said data processing means comprising:

segmentation means for segmenting the image data to identify the object surface;

processing means for approximating said segmented object surface data for determining a reference surface, which represents an approximated surface of said object surface devoid of the folded portions while comprising at least one flat patch;

analyzing means for determining points, for each patch of the reference surface, where the normal to the patch intersects the object surface and for identifying as a patch corresponding to a folded portion a patch of the reference surface that has a normal intersecting the object surface at more than one point;

said medical viewing system further comprising image visualization means for visualizing the object images and/or the processed images.

2. The medical viewing system of claim 1, further comprising data processing means for assigning, to the patches corresponding to the folded portions, called fold-portion patches, code values adapted to produce a first visual indication, at locations corresponding to said fold-portion patches, when image data corresponding to the reference surface is visualized.

3. The medical viewing system of claim 2, further comprising data processing means for determining fold-attribute data relating to patches of the reference surface identified as fold-portion patches.

4. The medical viewing system of claim 3, wherein the determined fold-attribute data includes the number of points at which the normal to the patch of the reference surface crosses the object surface and/or the respective distances between the reference surface and the points at which the normal to the patch of the reference surface crosses the object surface and/or the distance between selected points at which the normal to the patch of the reference surface crosses the object surface.

5. The medical viewing system of claim 3, wherein the data processing means for identifying the patch corresponding to the fold-portion and the data processing means for determining the fold-attribute data comprises threshold means to take into account only points no further than a threshold distance away from the reference surface.

6. The medical viewing system of claim 3, further comprising selection means for selecting one or more types of fold-attribute data, when image data corresponding to the reference surface is visualized.

7. The medical viewing system of claim 6, further comprising coding means for assigning, to the selected one or more types of fold-attribute data, code values adapted to produce a respective different second visual indication, at locations corresponding to said fold-portion patches, when image data corresponding to the reference surface is visualized.

8. The medical viewing system of claim 3, further comprising data processing means for:

providing a database of potential abnormalities and associated sets of fold-attribute data;

comparing fold-attribute data determined for the fold-portion patches with one or more of the sets of fold-attribute data of the database and, when a match is found for a first fold-portion patch, associating a potential-abnormality-flag with the first fold-portion patch.

9. The medical viewing system of one of claim 8, wherein the image visualization means comprises a display device and/or a printing device.

10. The medical viewing system of claim 9, implemented as a specially programmed general-purpose computer.

11. A medical examination apparatus comprising acquisition means for acquiring medical image data, imaging means for displaying the medical images, and a medical viewing system according to claim 8.

12. An image processing method to cause the data processing means of the medical viewing system claim 1 to perform steps of acquiring and processing image data in an object image of an object whose surface comprises at least a folded portion, wherein processing comprises:

segmenting the image data whereby to identify the object surface;

processing the object surface data for determining a reference surface, which represents an approximated surface of the object surface devoid of folded portions while comprising at least one flat patch;

for each patch of the reference surface, determining points where the normal to the patch intersects the object surface; and identifying as a patch corresponding to a folded portion a patch of the reference surface that has a normal intersecting the object surface at more than one point.

13. A computer program product having a set of instructions, when in use on a general-purpose computer, to cause the computer to perform the steps of the method according to claim 12.

* * * * *